United States Patent [19]

Asano et al.

[11] Patent Number: 5,124,825
[45] Date of Patent: Jun. 23, 1992

[54] LIQUID CRYSTAL DISPLAY DEVICE

[75] Inventors: Kazuo Asano; Toru Terasaka; Shinichi Nishi, all of Hachioji, Japan

[73] Assignee: Konica Corporation, Tokyo, Japan

[21] Appl. No.: 344,873

[22] Filed: Apr. 28, 1989

[30] Foreign Application Priority Data

May 2, 1988 [JP] Japan .................. 63-107574

[51] Int. Cl.⁵ .............................. G02F 1/13
[52] U.S. Cl. ........................ 359/77; 359/102
[58] Field of Search .......... 350/337, 340, 341, 350 R, 350/346; 359/75, 77, 102

[56] References Cited

U.S. PATENT DOCUMENTS

| | | | |
|---|---|---|---|
| 4,608,558 | 8/1986 | Amstutz et al. | 350/350 S |
| 4,653,865 | 3/1987 | Kando et al. | 350/337 |
| 4,693,562 | 9/1987 | Hasegawa et al. | 350/337 |
| 4,759,612 | 7/1988 | Nakatsuka et al. | 350/338 |
| 4,767,191 | 8/1988 | Van Sprang et al. | 350/341 |
| 4,776,674 | 10/1988 | Filas et al. | 350/341 |
| 4,856,875 | 8/1989 | Kozaki et al. | 350/341 |
| 4,909,605 | 3/1990 | Asano et al. | 350/341 |
| 4,974,940 | 12/1990 | Asano et al. | 350/340 |

OTHER PUBLICATIONS

Schadt, "Nematic Liquid Crystals and Electro-Optical Effects:Display Applications", *CHIMIA* 41 Nr. 10, Oct. 1987.
Wilson et al., "Alignment of Liquid Crystals on Surfaces with Films Deposited Obliquely at Low and High Rates", *Mol. Cryst. Liq. Cryst.*, vol. 94, 1983, pp. 359-366.
Scheffer, *J. Applied Physics* 58, (8), 1985, p. 3022.
Janning, *Applied Physics Letters* 21 No. 4, 1972, p. 173.

*Primary Examiner*—Andrew J. James
*Assistant Examiner*—Courtney A. Bowers
*Attorney, Agent, or Firm*—Finnegan, Henderson, Farabow, Garrett and Dunner

[57] ABSTRACT

A liquid crystal display device consisting essentially of a liquid crystal cell and a pair of polarizing plates disposed on the both sides of said liquid crystal cells is disclosed. The liquid crystal cell has a liquid crystal layer in which a nematic liquid crystal containing an optically active substance and forming a twisted structure is disposed between a pair of electrode substrates being oppositely disposed and each having an alignment layer, and said liquid crystal display device is characterized by satisfying Conditions (a) to (d);

Condition (a): a twist angle $\alpha$ of the twisted structure in the liquid crystal layer is 220° to 300°;

Condition (b): a pretilt angle $\theta_o$ made by a director of liquid crystal molecules contacting a face of the electrode substrate and the electrode substrate itself is not less than 25°;

Condition (c): a product, $\Delta n \cdot d$, of a refractive anisotropy, $\Delta n$, of the nematic liquid crystal and a thickness, d, of the liquid crystal layer is 0.65 to 0.90 $\mu$m;

Condition (d): in the relation to the twist angle $\alpha$, angles $\beta$ and $\gamma$ made by polarizing axes of a pair of the polarizing plates and the directions of aligning treatments of the electrode substrates adjacent to the respective polarizing plates satisfy Equation (1);

$$\alpha + \beta - \gamma - 180° = 90° - \delta \quad (1)$$

$$0° < \delta < 30°$$

19 Claims, 4 Drawing Sheets

LIQUID CRYSTAL DISPLAY DEVICE

FIELD OF THE INVENTION

The present invention relates to a liquid crystal display device with a simple structure and high luminance contrast, which has a large display capacity and is applicable to a color display device.

BACKGROUND OF THE INVENTION

Hitherto there has been disclosed an SBE (Supertwisted Birefringence Effect) type liquid crystal display device which is known as a liquid crystal display device capable of displaying a large amount of data at high luminance contrast in multiplex driving at a high duty ratio.

The SBE type liquid crystal display device, however, has a disadvantage that an image area as well as a background area is liable to be tinted with a specific color because a birefringence effect is utilized, and this disadvantage causes the problems of: (1) poor quality image, (2) no flexibility to meet the colors appointed by users, and (3) difficulty in displaying a color image.

To solve such a tinting problem and provide distinct monochromatic displaying, the following techniques have been hitherto proposed:

(1) OMI technique where in order to prevent tinting, the product, $\Delta n \cdot d$, of a refractive anisotropy, $\Delta n$, of a liquid crystal and a thickness, d ($\mu$m), of a liquid crystal layer is adjusted to 0.4 to 0.6 $\mu$m (Appl. Phys. Lett. 50 (1987) pp. 236-238);

(2) a double-layer cell technique where one liquid crystal cell is superposed on another liquid crystal cell containing a reversely twisted alignment of liquid crystal molecules in a liquid crystal layer to form a double-cell structure, and the another liquid crystal cell is used as an optical compensator in order to prevent tinting (Nikkei Micro-Device, Oct. 1987, pp.84-88).

However, the foregoing OMI technique (1) has the problems: a high luminance contrast is not attained; a displayed image is dark; and positive prevention of tinting is difficult.

The double-layer cell technique (2) has also the problems: a manufacturing cost and a weight of the device are more than those of the device composed of a single liquid crystal cell; and because of difficulty to make thicknesses of two liquid crystal cells uniform, a liquid crystal cell fails to fully function as an optical compensator, so that it is difficult to completely prevent tinting.

Further, luminance contrast is dependent on an average tilt angle $\theta^{ON}$ of liquid crystal molecules, and the average tilt angle increases with an angle $\theta_0$ (pretilt angle) made by an electrode substrate and a director of the liquid crystal molecules which are in contact with the electrode substrate. The angle $\theta_0$ is settled when an alignment layer is formed. A conventional alignment layer is formed by a rubbing technique, and the pretilt angle $\theta_0$ is usually about 10°, or at most 25°; however, the pretilt angle $\theta_0$ of such level does not contribute to achieving preferable luminance contrast of not less than 50.

SUMMARY OF THE INVENTION

The present invention is intended to solve the above-mentioned problems, and the object of the invention is to provide a liquid crystal display device with a simple structure, which is capable of displaying a clear image with a high contrast and less tinting in multiplex driving at a high duty ratio and is capable of displaying a color image with high color purity in combination with a color filter, while reducing a production cost.

BRIEF DESCRIPTION OF THE DRAWINGS

FIG. 8 is cross-section schematically illustrating a liquid crystal display device of the invention; wherein

Figure 1:
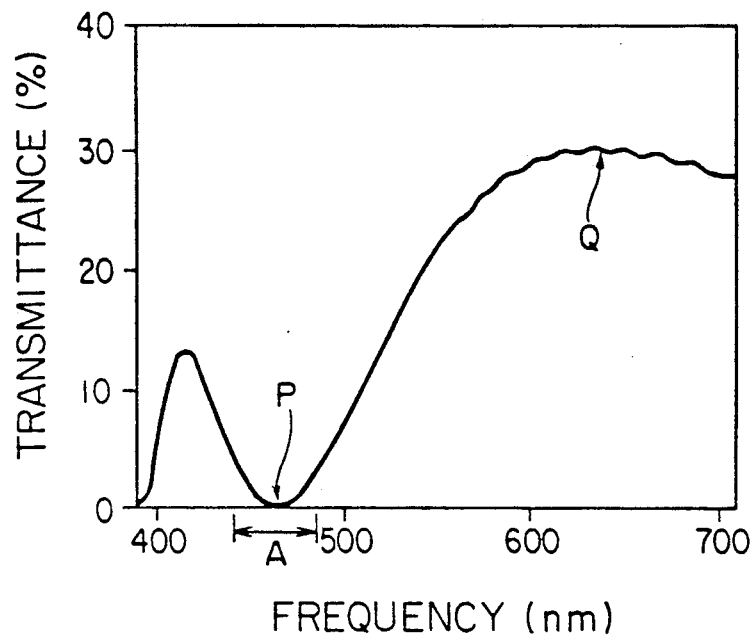
FIG. 1 illustrates a transmittance spectrum of a conventional SBE type liquid crystal display device.

| | |
|---|---|
| 11, 12 | Electrode substrates |
| 11A, 12A | Support plates |
| 11B, 12B | Electrode layers |
| 11C, 12C | Alignment layers |
| 20 | Liquid crystal layer |
| 30 | Liquid crystal cell |
| 32 | Nematic liquid crystal |
| 41, 42 | Polarizing plates |
| 51, 52 | Alignment layers |
| 61, 72 | Spacers |
| 71 | Sealing |

DESCRIPTION OF THE INVENTION

To attain the above-mentioned object, a liquid crystal display device of the invention comprises of a liquid crystal cell having a liquid crystal layer where a nematic liquid crystal containing an optically active substance and forming a twisted structure is disposed between a pair of the electrode substrates being oppositely disposed and each having an alignment layer, and a pair of the polarizing plates disposed on the both sides of the liquid crystal cell, wherein the liquid crystal display device of the invention is characterized by fulfilling the following conditions (a) to (d);

Condition (a): a twist angle $\alpha$ in a liquid crystal layer having a twisted structure is 220° to 300°;

Condition (b): an angle (pretilt angle) $\theta_0$ made by a director of liquid crystal molecules in contact with an electrode substrate and the electrode substrate itself is not less than 25°;

Condition (c): the product, $\Delta n \cdot d$, of a refractive anisotropy, $\Delta n$, of a nematic liquid crystal and a thickness, d ($\mu$m), of a liquid crystal layer is 0.65 to 0.90 $\mu$m;

Condition (d): the twist angle $\alpha$ and the angles $\beta$ and $\gamma$ made by the polarizing axes of the polarizing plates and the directions of aligning treatments of the electrode substrates adjacent to the respective polarizing plates satisfy the following Equation (1)

$$\alpha + \beta - \gamma - 180° = 90° - \delta \qquad (1)$$

$$(0° < \delta < 30°)$$

further, it is preferable that the twist angle $\alpha$ and the angle $\beta$ satisfy the following Equation (2):

Equation (2): $\beta = \dfrac{360° - \alpha}{2} - \dfrac{\delta}{2}$

It is further preferable that the following conditions (e) through (g) be satisfied:

Condition (e): Equation (3) is satisfied by a spontaneous twist pitch $P_s$ of a nematic liquid crystal containing an optically active substance and a compulsive twist pitch $P_c$ of a liquid crystal layer where a twisted structure is forced to be regulated with an alignment layer;

$$-0.1 < (P_c - P_s)/P_s < 0.3$$

Condition (f): either a splay elastic constant $k_{11}$ or a twist elastic constant $K_{22}$ and a bend elastic constant $K_{33}$ of a nematic liquid crystal satisfy at least one of the following Equations (4) and (5):

$$1.8 < k_{33}/k_{22} < 2.8$$

$$0.9 < k_{33}/k_{11} < 1.5$$

Condition (g): a ratio, $\Delta\epsilon/\epsilon_{195}$, of a dielectric anisotropy, $\Delta\epsilon$, of a nematic liquid crystal to a dielectric constant, $\epsilon\perp$, in a direction perpendicular to a parallel axis of liquid crystal molecules is not less than 1.8.

The present invention is hereunder described in further detail.

Usually, when displaying a color image with an additive color mixture method by combinedly incorporating a red (R) filter, a green (G) filter and a blue (B) filter into a black/white monochromatic liquid crystal display device, the liquid crystal display device is required to satisfy the following criteria in order to achieve displaying of high purity colors:

(1) in a bright state where light is transmitted, three spectrums (red, green and blue) are equally transmitted;

(2) luminance contrast in an ON/OFF state is sufficiently high in red, green and blue spectral regions.

The present inventors studied the reason why tinting is caused in the bright state in a liquid crystal display device comprising a conventional SBE type liquid crystal cell, and found that in a transmittance spectrum of the bright state there is a non-transmittance spectral region A where almost no light can be transmitted, as shown in FIG. 1.

This non-transmittance spectral region A shifts to a shorter wavelength by decreasing the product, $\Delta n \cdot d$, of a refractive anisotropy, $\Delta n$, of a nematic liquid crystal and a thickness, d (μm), of a liquid crystal layer.

However, an excessively small product $\Delta n \cdot d$ results in lower light transmittance in an overall visible wavelength region and therefore darker displaying in the bright state.

Based on the above-mentioned findings, the inventors further continued studies, and found that the product, $\Delta n \cdot d$, of not more than 0.90 μm and not less than 0.65 μm (Condition (c)) makes it possible to shift the non-transmittance spectral region A from the visible light spectral region to the UV region and to prevent tinting, while a sufficiently high optical transmittance can be ensured in an entire visible wavelength region, and much brighter display can be achieved in the bright state. The product, $\Delta n \cdot d$, is more preferably 0.75 to 0.90 μm.

Further studies revealed that changing the angles $\beta$ and $\gamma$ of a pair of polarizing plates disposed on the both sides of the liquid crystal cell affects the transmittances in a minimum point P and a maximum point Q of the transmittance spectrum shown in FIG. 1. To be more concrete, the transmittance in the minimum point P increases gradually by changing a value of $\beta + \gamma$ from 90° to 0°, while the transmittance in the maximum point Q decreases gradually by increasing the difference of the absolute values of the angles $\beta$ and $\gamma$.

Therefore, it is theoretically feasible that the adequately adjusted angles $\beta$ and $\gamma$ can make the transmittance spectrum flat and thereby eliminate a tinting problem. As a matter of fact, however, it is difficult to make a transmittance spectrum flat only by adjusting the angles $\beta$ and $\gamma$, and therefore, it is preferable to use a relevant optical filter that equalizes transmittance spectrums or to correct the transmittance spectrum by selecting a light source in order to make the transmittance spectrum flat.

Meanwhile, enhancing a luminance contrast of a display requires minimization of light leaking in a dark state (no transmitted light). Especially in the case where a color image is displayed by combinedly using three color filters, i.e. red, green and blue filters, light leaking should be kept to an absolutely minimum level in order to improve color purity.

In this respect, a conventional SBE type liquid crystal display device provides a luminance contrast of about 20 at most in multiplex driving at a 1/100 duty ratio, and this level of contrast is still insufficient for color display. More specifically, a color display for a practical use requires a luminance contrast of more than 30.

As a result of further studies, the inventors found that in combining a liquid crystal cell having a nematic liquid crystal layer with a twisted structure and a pair of the polarizing plates, the following Equation (1) has to be satisfied by the twist angle $\alpha$, the fixed angle $\beta$ of one polarizing plate, and the angle $\gamma$ of another polarizing plate so as to minimize a transmittance in the dark state;

$$\alpha - \beta - \gamma - 180° = 90° - \delta$$

$$(0° < \delta < 30°)$$

In other words, the transmittance in the dark condition can be minimized by selecting the angles $\beta$ and $\gamma$ in relation to the twist angle c based on the Equation (1), and thereby, light leaking in the dark state can be reduced, which results in a higher luminance contrast.

The value $\delta$ is dependent on the average tilt angle $\theta^{ON}$ of liquid crystal molecules in a nematic liquid crystal layer in the dark state where ON voltage is loaded, and when the average tilt angle $\theta^{ON}$ nears 90°, the value $\delta$ nears 0°. In this respect, the average tilt angle $\theta^{ON}$ means an average value of the tilt angles made by a director of liquid crystal molecules and an electrode substrate, which is estimated in a thickness direction of a liquid crystal layer. The average tilt angle $\theta^{ON}$ depends on a type of an alignment layer, physical properties of a nematic liquid crystal, and a level of an ON voltage.

In Equation (1), the left side is equal to an angle made by the polarizing axes of a pair of polarizing plates. Therefore, if the liquid crystal molecules in a liquid crystal layer are completely aligned along an electrical field in loading an ON voltage ($\theta^{ON} = 90°$), then the left side of Equation (1) is equal to 90°, and light leaking in the dark condition becomes minimum. In reality, however, even if an ON voltage is loaded, the liquid crystal molecules in the liquid crystal layer are not completely in a vertical alignment ($\theta^{O.N} < 90°$), and therefore, the liquid crystal layer exhibits a slight retardation affecting incident light. It was found that in order to minimize light leaking in the dark state, the value of the left side in Equation (1) has to shift from 90° by a correction angle $\delta$ in proportion to the average tilt angle $\theta^{O.N}$ to eliminate the optically active effect due to such retardation. A shift direction has to be such that the value $\delta$ is positive. The correlation between the value $\delta$ and the average tilt angle $\theta^{O.N}$ in loading an ON voltage is shown in FIG. 2.

Figure 2:
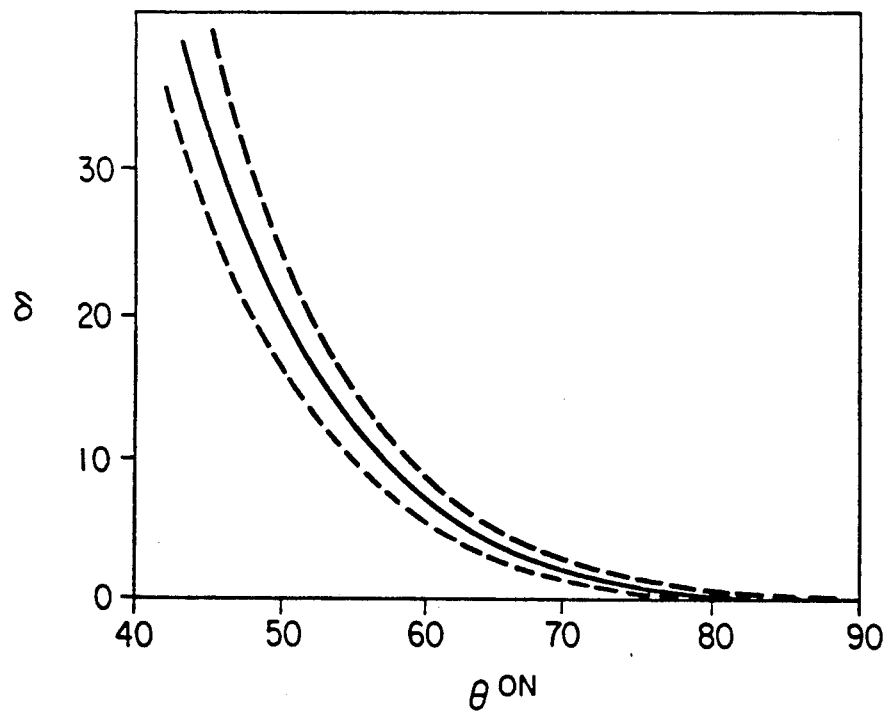
FIG. 2 is diagram illustrating a correlation between $\delta$ and an average tilt angle $\theta^{ON}$ in loading an ON voltage.

In FIG. 2, the solid line indicates the correlation between the average tilt angle $\theta^{O.N}$ in loading an ON voltage and the value $\delta$, provided that $\Delta n \cdot d$ is 0.77 $\mu$m; meanwhile the broken lines show the range where the correlation indicated by the solid line shift when $\Delta n \cdot d$ varies from 0.65 to 0.90 $\mu$m.

Though virtually impossible to measure, the average tilt angle $\theta^{O.N}$ can be estimated by measuring retardation shown by a liquid crystal cell. In the condition that the bistable levels shown by the liquid crystal cells are equal, the average pretilt angle $\theta^{O.N}$ is approximately proportional to the pretilt angle $\theta_0$.

Further studies by the inventors revealed that the foregoing minimum value can be further depressed by settling the angle $\beta$ according to the following Equation (2):

$$\text{Equation (2): } \beta = \frac{360° - \alpha}{2} - \frac{\delta}{2}$$

To sum up, luminance contrast can be maximized by selecting the angles $\beta$ and $\gamma$ of a pair of polarizing plates so that these angles satisfy both Equations (1) and (2) based on the twist angle $\alpha$ of a liquid crystal layer of a liquid crystal cell.

The inventors performed multiplex driving at a 1/100 duty ratio to study the conditions of a liquid crystal cell for raising luminance contrast to 30 or higher, and found that an alignment of a liquid crystal has to exhibit a slight bistable phenomenon to a driving voltage.

Figure 3:
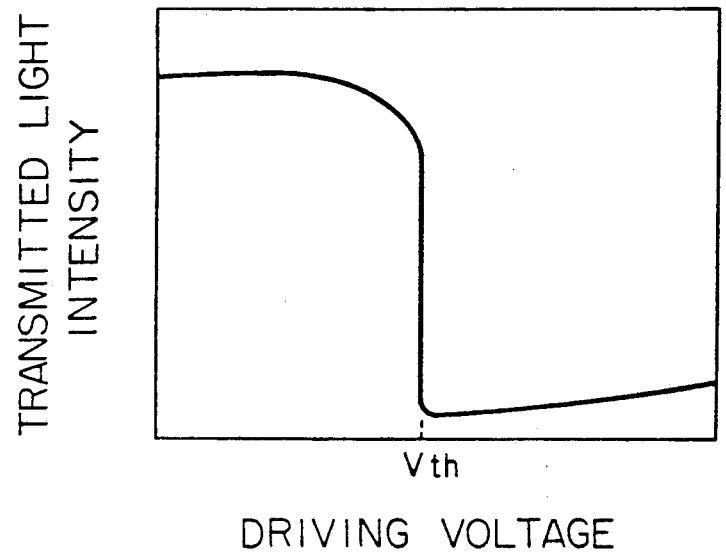
FIG. 3 is a diagram illustrating a bistable phenomenon.

The "bistable phenomenon" is a phenomenon where, as shown in FIG. 3, an alignment transition of liquid crystal molecules accompanying shift of discrination line from an area of an OFF state alignment to that of an ON state alignment is observed at a threshold voltage $V_{th}$ of a driving voltage. Once the bistable phenomenon occurs, an intensity of transmitted light relative to a driving voltage suddenly changes at the threshold voltage $V_{th}$.

In order to allow an alignment of liquid crystal molecules to exhibit a slight bistable phenomenon to a driving voltage, the twist angle $\alpha$ of a twisted structure in a nematic liquid crystal layer has to be not less that 220°.

Figure 4:
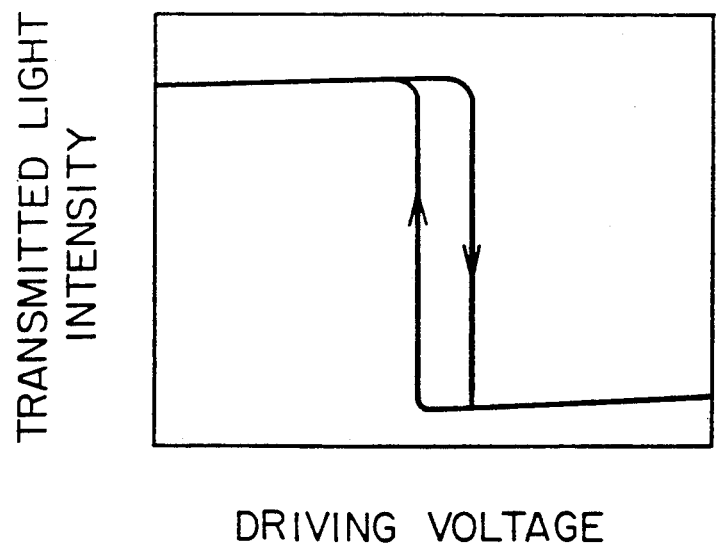
FIG. 4 is diagram illustrating a histeresis of the bistable phenomenon.

However, as indicated in FIG. 4, the excessively large twist angle $\alpha$ results in the larger bistable phenomenon, and the intensity of transmitted light relative to a driving voltage exhibits a hysteresis phenomenon, so that a dark/bright switching response speed of a display toward on/off of a driving voltage becomes slower in multiplex driving. Therefore, the twist angle $\alpha$ has to be 300° or smaller in order to increase the foregoing response speed.

In order to minimize a bistable phenomenon so as to further increase a response speed of a display toward on/off of the driving voltage in multiplex driving, the following Conditions (e) through (g) are preferably satisfied;

Condition (e): Equation (3) is satisfied by the spontaneous twist pitch $P_s$ of a nematic liquid crystal containing an optically active substance and by a compulsive twist pitch $P_c$ of a liquid crystal layer where a twisted structure is forced to be regulated with alignment layers;

$$-0.1 < (P_c - P_s)/P_s < 0.3$$

Condition (f): either a splay elastic constant $k_{11}$ or a twist elastic constant $K_{22}$ of a nematic liquid crystal and a bend elastic constant $K_{33}$ satisfy at least one of the following Equations (4) and (5):

$$1.8 < k_{33}k_{22} < 2.8$$

$$0.9 < k_{33}/k_{11} < 1.5$$

Condition (g): the ratio, $\Delta\epsilon/\epsilon_\perp$, of a dielectric anisotropy, $\Delta\perp$, of a nematic liquid crystal to a dielectric constant, $\epsilon_\perp$, in a direction perpendicular to a parallel axis of liquid crystal molecules is not less than 1.8.

As a result of further studies, the inventors found that with respect to a liquid crystal cell which satisfies Conditions (a), (c) and (d) and exhibits a slight bistable phenomenon, an intensity of leaked light in a dark state (no transmitted light in loading an ON voltage) in multiplex driving depends on the pretilt angle $\theta_0$. In other words, it is necessary to satisfy the following Condition (b) in order to minimize the leaked light;

Condition (b): the pretilt angle $\theta_0$ made by a director of liquid crystal molecules in contact with an electrode substrate and the electrode substrate itself is not less than 25°.

The pretilt angle $\theta_0$ exceeding 25° can depress leaked light in a dark state to a sufficiently low level to raise actually a luminance contrast to 30 or higher in multiplex driving at 1/100 duty ratio.

Once these Conditions (a) through (d) are satisfied, brightness of a liquid crystal cell in the bright state can be maximized at the twist angle $\alpha$ of around ($270° - \delta$). Accordingly, such twist angle $\alpha$ can further enhance luminance contrast.

The optimum $\delta$ value in Equation (1) is determined based on a type of an alignment layer and the physical property values of a liquid crystal; in the same liquid crystal, the smaller the pretilt angle $\theta_0$ is, the larger the $\delta$ value is, and the smaller the $\delta$ value is, the less the leaked light in the dark state is.

In a liquid crystal cell having a larger $\delta$ value, more light leaks in the dark condition. A liquid crystal cell having a value $\delta$ of 30° or greater cannot provide a satisfactory luminance contrast even if other parameters are optimized.

The results of studies by the inventors indicate the $\delta$ value ranges at $0° < \delta < 30°$ in the pretilt angle $\theta$ of 25° or greater.

The larger the bistable phenomenon of a liquid crystal cell is, the smaller the $\delta$ value is.

An optimum value $\delta$ depends on a combination of a type of an alignment layer and a liquid crystal. Therefore, it has to be determined in every combination.

Actually, the optimum value $\delta$ is determined in the following manner.

The initial values of the angles $\beta$ and $\gamma$ of a pair of the polarizing plates in a liquid crystal cell that satisfies the above-stated Conditions (a) through (c) are set to:

$$\beta = (360° - \alpha)/2$$

$$\gamma = (\alpha - 180°)/2$$

Next, while $\beta$ and $\gamma$ are gradually varied from the initial values according to the following equations, an intensity of leaked light in a dark state is measured to determine $\omega_0$ which is the value of $\omega$ in the minimum intensity.

$$\beta = (360° - \alpha)/2 - \omega$$

$$\gamma = (\alpha - 180°)/2 - \omega$$

As can be understood from the foregoing Equation (2), the above-mentioned $\omega_0$ is equal to $\delta/2$, thereby the value $\delta$ can be determined.

Once the value $\delta$ is determined, an optimum combination of $\beta$ and $\gamma$ is arbitrarily determined based on the $\delta$ value and Equation (1), and one combination of the optimum $\beta$ and $\gamma$ values in turn determines the maximum luminance contrast attained at these optimum values; the contrast is satisfactorily high even in the vicinity of these optimum values. However, variation of the contrast level relative to deviation of the angles $\beta$ and $\gamma$ from the optimum values is so remarkable that no sufficient contrast can be obtained even by mere $\pm 5°$ or more deviation from the respective optimum values of the angles $\beta$ and $\gamma$.

The term "ON voltage" in this context means an ON voltage $V_{ON}$ corresponding to an effective ON/OFF voltage ratio $$V_{ON}/V_{OFF} = \left( \frac{(N)^{\frac{1}{2}} + 1}{(N)^{\frac{1}{2}} - 1} \right)^{\frac{1}{2}}$$

in multiplex driving at a 1/N duty ratio, and also means an ON voltage where a switching response time $t_{ON}$ from a bright state to dark one is equal to a switching response time $t_{OFF}$ from dark one to bright one.

Table 1 below summarizes the experimentally obtained values representing the relation between the pretilt angle $\theta_0$ and $\delta$ of a liquid crystal cell where the twist angle $\alpha$ satisfies the previously mentioned Condition (a).

TABLE 1

| Pretilt angle $\theta_0$ | $\delta$ |
|---|---|
| 25° | 15 to 30° |
| 30° | 10 to 25° |
| 40° | 5 to 20° |
| 50° | 0 to 10° |

As described above, maximum luminance contrast is obtained by selecting both the angles $\beta$ and $\gamma$ of the polarizing plates so as to satisfy either of the above-mentioned Equations (1) and (2). Meanwhile, if the angles $\beta$ and $\gamma$ are selected so that only Equation (1) is satisfied and the values of $\beta + \gamma$ is varied from 90° to 0° or 90° to 180°, brightness of a display in a bright state increases, and tinting decreases.

Therefore, in order to fulfill the conditions for either of the optimum luminance contrast and brightness in the bright state from a practical viewpoint, the angles $\beta$ and $\gamma$ may be selected so that $\beta + \gamma$ shifts from 90° with a range satisfying Equation (1).

Next, the other preferred conditions in preparing an actual liquid crystal display device of the invention are hereunder described.

(1) A preferable transition temperature $T_{NI}$ is 90° C. or higher, where a nematic liquid crystal phase is converted to an isotropic liquid.

Selection of this preferable condition makes it possible to depress the variations in a displayed color, a driving voltage, a response speed etc., which are caused by a temperature variation at a range of a normal operation temperature, and a reliable liquid crystal display device can be provided.

(2) A refractive anisotropy, $\Delta n$, of a nematic liquid crystal is preferably not less than 0.10.

Selection of this preferable condition can make liquid crystal cell thinner and results in providing a further excellent response attributable to a shortened time necessary for switching ON/OFF.

(3) Viscosity $\eta$ of a nematic liquid crystal at 20° C. is preferably not higher than 30 cp.

Selection of this preferable condition makes it possible to shorten remarkably a rise time of a liquid crystal display device, which contributes to further excellent response.

(4) In order to stabilize a twist state of a liquid crystal molecule and prevent an alignment portion of a liquid crystal molecule that has a different twist angle, a thickness, d, of a liquid crystal layer and a spontaneous twist pitch $T_s$ preferably satisfies the following Equation;

$$(\alpha/360) - 0.25 < d/P_s < (\alpha/360) + 0.30$$

An excessively small $d/P_s$ value may form an alignment portion having a twist angle 180° smaller than an intended twist angle $\alpha$. Meanwhile, an excessively large $d/P_s$ value may form an alignment portion having a twist angle 180° larger than an intended twist angle $\alpha$.

In the invention, a refractive anisotropy $\Delta n$, splay elastic constant $k_{11}$, twist elastic constant $k_{22}$, bend elastic constant $k_{33}$, dielectric anisotropy $\Delta \epsilon$, dielectric constant $\epsilon_{TM}$, transition temperature $T_{NI}$, and viscosity $\eta$ are the physical properties of a nematic liquid crystal containing no optically active substance. However, since only a trace amount of the optically active substance is added, the physical properties of a nematic liquid crystal containing this substance are virtually not different from those of the liquid crystal containing no such substance.

The pretilt angle $\theta_0$ can be measured, for example, by a magneto-capacitive null method (J. Appl. Phys. 48, 1783 (1977)).

In the invention, the angle $\beta$ is defined by the angle of polarizing plate at an incident light side, and the angle $\gamma$ is defined by the angle of polarizing plate at on outgoing light side in a transmittance type liquid crystal display device, and by the angle of polarizing plate at a reflection side in a reflection type liquid crystal display device.

The setting angle $\alpha$f a polarizing plate is defined by an angle made by a line of a director (a dominant aligning direction of parallel axes of liquid crystal molecules contacting an electrode substrate), which is assumed to be projected on the electrode substrate, and a polarizing axis (a transmittance axis or an absorption axis) of a polarizing plate disposed on the electrode substrate.

The angles $\beta$ and $\gamma$ of the polarizing plates are converted to the values ranging from −90° to +90°; for example, an angle $\beta = 135°$ is converted to the angle $\beta = -45°$.

In this respect, a projection direction of a director of liquid crystal molecules contacting an electrode substrate, which is projected onto the surface of the electrode substrate, usually corresponds to a direction of an aligning treatment of an alignment layer on the electrode substrate; the direction of the aligning treatment corresponds to that of evaporation-deposition when the alignment is performed by an oblique evaporation-deposition method, and to a rubbing direction when it is performed by a rubbing method.

A polarizing plate may be either a transmittance axis or an absorption axis. If both the angles $\beta$ and $\gamma$ are determined by the transmittance axis or the absorption axis, a liquid crystal display device assumes a display mode (normally white) of a bright state in loading an OFF voltage and of a dark state in loading an ON voltage. Especially high luminance contrast can be achieved by this mode. The description in this specification is based on this display mode.

If one of the distortion angles $\beta$ and $\gamma$ is determined by the transmittance axis and the other by the absorption axis, the liquid crystal device assumes a display mode (normally black) of a dark state in loading an OFF voltage and a bright state in loading an ON voltage. An excellent bright state free of tinting can be achieved by this display mode.

Figure 5:
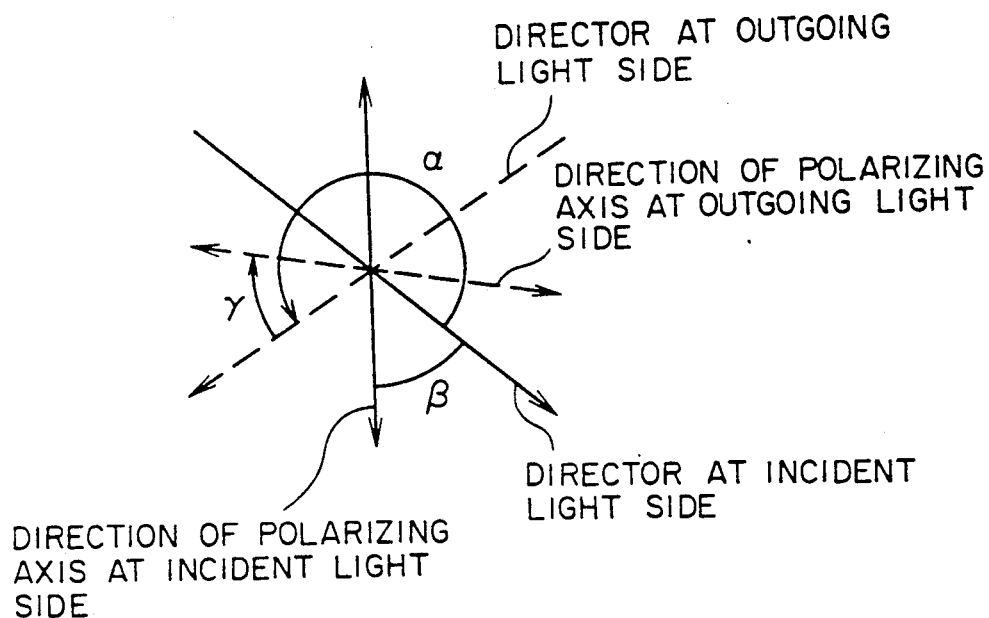
FIGS. 5 and 6 illustrate an interrelation among a twist angle $\alpha$ and the angles $\beta$ and $\gamma$.
Figure 6:
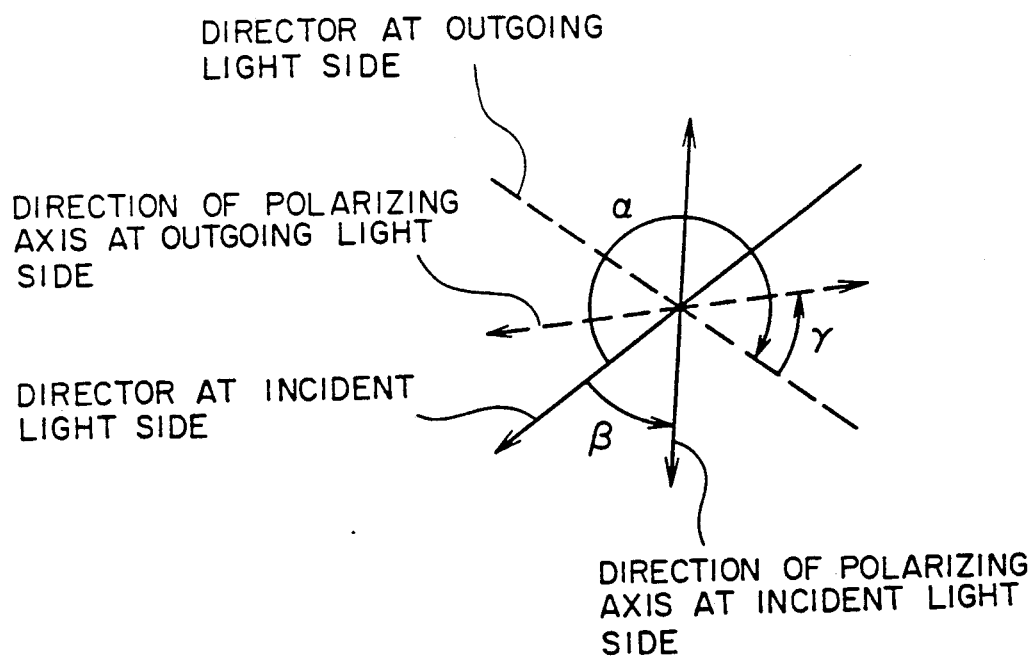

The signs of the distortion angles $\beta$ and $\gamma$ are defined as follows: as shown in FIG. 5, when a twist direction of a liquid crystal layer is counterclockwise toward a direction of incident light, a positive sign is assigned to a clockwise direction toward direction of a polarization axis from the director of liquid crystal molecules in contact with an electrode substrate; meanwhile, as shown in FIG. 6, when a twist direction of a liquid crystal layer is clockwise toward the direction of incident light, a positive sign is assigned to a counterclockwise direction.

A twist angle $\alpha$ can usually be regulated by the alignment directions of the alignment layers provided on the respective electrodes substrates, and the types and amounts of a nematic liquid crystal and an optically active substance added thereto.

Figure 7:
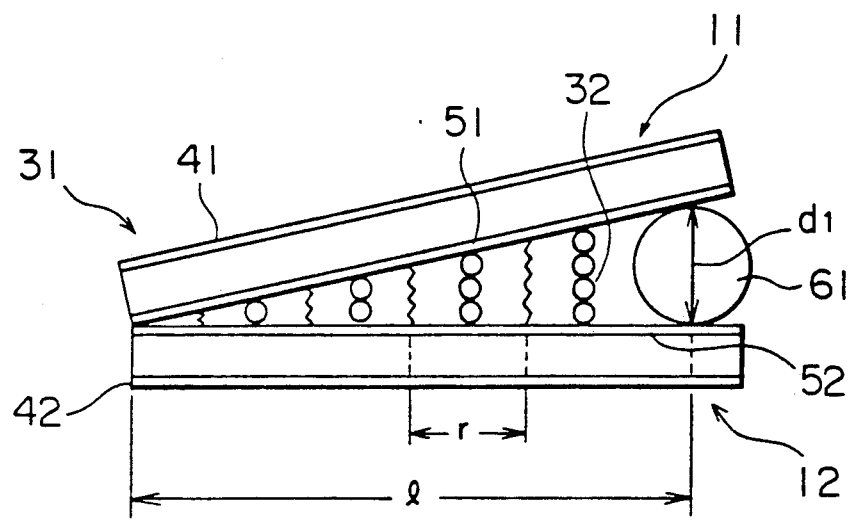
FIG. 7 schematically illustrates a procedure for identifying a spontaneous twist pitch $P_s$.

A spontaneous twist pitch $P_s$ is defined by a pitch in an intrinsic twist configuration of a liquid crystal layer, which is formed by adding an optically active substance to a nematic liquid crystal. The spontaneous twist pitch $P_s$ can be determined from the following equation by measuring, as shown in FIG. 7, a width r of stripped patterns (a discrination line per ½ pitch) formed on a face of a liquid crystal cell 31 when a nematic liquid crystal 32 is sealed in it, a thickness $d_1$ of a liquid crystal layer and length l of the liquid crystal cell 31, wherein the electrode substrates 11 and 12 having the alignment layers 51 and 52 are disposed in a wedge to form the liquid crystal cell 31 so that the alignment layer 51 and 52 are opposite;

Spontaneous twist pitch $P_s = 2d_1 r/l$

Numeral 61 represents a spacer, and 41 and 42 represent polarizing plates. The alignment layers 51 and 52 are subjected to an aligning treatment to a direction parallel to each other.

A compulsive twist pitch $P_c$ is defined by a thickness d of a liquid crystal layer and a twist angle $\alpha$, according to the following Equation;

Compulsive twist pitch $P_c = (360°/\alpha) \times d$ $k_{33}/k_{22}$ and $k_{33}/k_{11}$ can be determined by a method where they are determined by a threshold value of an electrical capacity variation observed in applying a magnetic field to an equally aligned liquid crystal cell or an optical variation (H. Gruler, et. al., z. Naturforsch, 279 (1972) 966); or by a method where they are determined by a variation of an electrical capacity occurring in applying an electrical field to a homogeneously aligned liquid crystal cell (H. Dueling, Mol. Cryst. Liq. Cryst. 19 (1972) 123).

The techniques for forming an electrode substrate having an alignment layer are not limited to a specific scope, and the various conventional techniques can be used for this purpose. The present invention requires the pretilt angle $\theta_0$ of not less than 25°, preferably not less than 30°, and therefore, the following techniques are preferred;

(1) a technique where an evaporation deposition material such as SiO, MgO, and $MgF_2$ is obliquely evaporation-deposited or sputtered on a surface of an electrode substrate;

(2) a rubbing technique where on a surface of an electrode substrate is formed a layer of a high molecular material such as a polymer of imide, amide, vinyl alcohol or phenoxy each having a non-polar linear chain in its polymeric principal or side chain, and the surface of the layer is rubbed with woven fabric, flocked fabric or loose-woven fabric made of cotton, vinylon, tetrone, nylon, rayon, or carbon fibers;

(3) a rubbing technique where on a surface of an electrode substrate is formed a layer of an alignment treating agent prepared by mixing a prescribed amount of a homeotropic alignment treating agent such as a carboxylic acid chromium complex and an organic silane compound with a homogeneous alignment treating agent such as polyimide, polyamide and polyvinyl alcohol, and the surface of the layer is rubbed;

(4) a technique where the gratingwise grooves are formed in a uniform direction by photolithography or anisotropic etching on a surface of an electrode substrate;

(5) a technique where an LB (Langumuir-Blodgett) layer is formed on a surface of an electrode substrate in order to provide alignment. The foregoing technique (1) or (2) is preferable in order to form a uniform alignment layer having the pretilt angle of not less than 25°.

In the present invention, a liquid crystal display device may comprise of an alignment layer composed of a high molecular compound having an non-polar atomic group in its principal chain.

The "non-polar atomic group" means an atomic group composed only of a non-polar group which constitutes a principal chain of a high molecular substance such as an aliphatic or aromatic hydrocarbon group, or an atomic group which contains partially a polar group but is substantially insoluble in a polar solvent because of large non-polar groups surrounding the polar group concerned. The "principal chain" means a chain principally forming a polymer skeleton in a high molecular substance where the repetitive units are connected by linkages of imide, amide, ester, ether and the like.

A non-polar atomic group is preferably a linear chain-type group, however, it may be partially branched. The aliphatic non-polar atomic group preferably has 5 or more carbon atoms, in particular, 5 to 20 carbon atoms. The non-polar atomic group having 4 or less carbon atoms does not provide a satisfactorily large pretilt angle. In other words, the non-polar group having large number of carbon atoms can provide a satisfactorily large pretilt angle. However, the non-polar group having 20 or more carbon atoms results in a poor coating property of a coating solution or poor adhesion of a coating layer to a substrate.

Such non-polar atomic group preferably comprises of non-polar groups alone, however, it may have partially a less polar group. Each repetitive unit in a principal chain may have one or more non-polar atomic groups, or every several repetitive units may have one or more non-polar atomic groups. Practically, every five repetitive units preferably has one or more non-polar atomic groups. The non-polar atomic group may comprise of a single group or of a combination of two or more groups.

More specifically, the preferred non-polar atomic groups are as follows:

(1) a linear alkyl group having 5 or more carbon atoms;
(2) a linear alkyl group having 5 or more carbon atoms, of which part is substituted with the following non-polar groups or groups with less polarity;

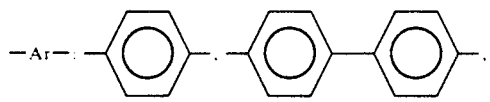

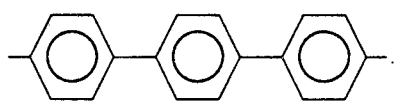

Heterocyclic group:

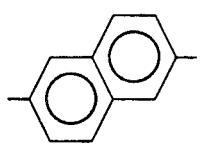 (X: NH, O, S)

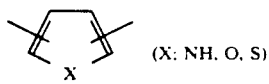 (Y: N)

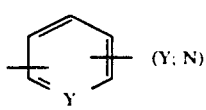 (Trans)

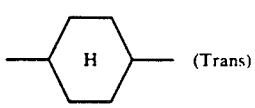

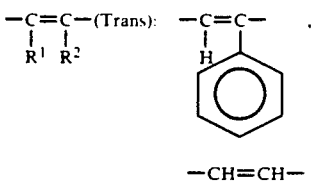

($R^1$, $R^2$: H, alkyl group, allyl group)

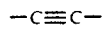

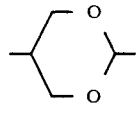

(3) a linear alkyl group having 5 or more carbon atoms, to which a branch having not more than 20 carbon atoms is bonded;
(4) the above-mentioned alkyl group whose hydrogen atoms are partially or entirely replaced with fluorine atoms;
(5) a linear silyl group having three or more silicon atoms.

The typical examples of a non-polar atomic group are represented by the following structural formulas;

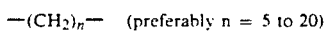 (preferably n = 5 to 20)

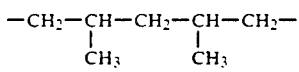

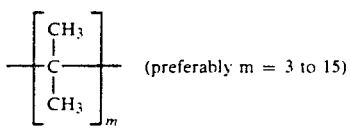 (preferably m = 3 to 15)

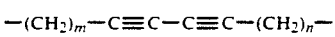

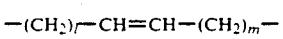

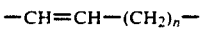

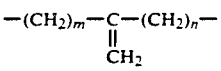

A site of a non-polar atomic group bonded to a principal chain may be, in the case of a polyimide series high molecular compound, either on a dicarboxylic anhydride or a diamine, both of which are monomers composing of the high molecular compound. In the case of polyamic acid which is a precursor of a polyimide series high molecular compound, possible bonding sites are on $R^2$ derived from a diamine and $R^1$ derived from a dicarboxylic anhydride, as shown in a structural formula (1) below;

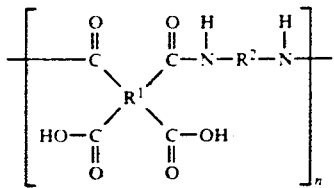

wherein $R^1$ and $R_2$ independently represent an aromatic group, an aliphatic group or an alicyclic group.

The examples of a material for forming a layer composed of a polyimide series or polyamide series high molecular compound include polyimide, polyimidoamide, polyester imide, polyamide, polyester amide and polyether amide each having a non-polar atomic group. Polyamic acid which is a precursor of polyimide having a non-polar group may be heated to be converted to polyimide These polyimide series or polyamide series high molecular compounds can be modified by a cross-linking agent so as to increase layer strength, or by a silane coupling agent so as to increase an adhesion strength.

The useful polyimide series or polyamide series high molecular compound each having a non-polar atomic group has a weight average molecular weight of 1,000 to 5,000,000. A basic skeleton of such a polyimide series or polyamide series high molecular compound is an aromatic, aliphatic or alicyclic skeleton. Of these compounds, preferred are the aromatic polyimide series and aromatic polyamide series compounds because they can provide a high molecular layer of high heat resistance and high mechanical strength.

A manufacturing method for an alignment layer according to the invention is hereunder described in detail.

According to the invention, a coating solution is prepared from polyamic acid or polyamide each having a non-polar atomic group in its principal chain, and a polar solvent, coated on a substrate for a liquid crystal display device, dried and/or heated in order to form a layer of a polyimide or polyamide series high molecular compound. Then, the layer is subjected to an aligning treatment to form an alignment layer.

Polyamic acid having a non-polar atomic group is formed by condensing a dicarboxylic anhydride with a diamine, provided that at least one of these components has to have a non-polar atomic group.

The examples of the diamine having a non-polar atomic group include m-phenylenediamine, p-phenylenediamine, m-xylenediamine, 4,4'-diaminodiphenyl ether, 4,4'-diaminodiphenyl methane, 3,3'-dimethyl-4,4'-diaminodiphenyl methane, 3,3'5,5'-tetramethyl-4,4'-diaminodiphenyl methane, 2,2'-bis(4-aminophenyl)propane, benzidine, 4,4'-diaminophenyl sulfide, 4,4'-diaminodiphenylsulfone, 1,5-diaminonaphthalene, 3,3'-dimethylbenzidine, 3,3'-dimethoxybenzidine, 2,4'bis($\beta$-amino-tert-butyne) toluene, bis(4-$\beta$-amino-tert-butylphenyl) ether, 1,4-bis(2-methyl-4-aminopentyl) benzene, 1,4-bis(4-aminophenoxy) benzene, bis($\gamma$-aminopropyl)tetramethyldisiloxane, and 4,4'-diaminodiphenyl tetramethyldisiloxane, wherein to a principal chain of each diamine is bonded a non-polar atomic group. Particularly preferred diamines are an aromatic series because of better heat resistance.

The examples of the dicarboxylic anhydride include pyromellitic anhydride, 2,3,6,7-naphthalenetetracarboxylic anhydride, 3,3',4,4'-diphenyltetracarboxylic anhydride, 1,2,5,6-naphthalenetetracarboxylic anhydride, 2,2',3,3'-diphenyltetracarboxylic anhydride, thiophene-2,3,4,5-tetracrboxylic anhydride, 2,2'-bis(3,4-bis-carboxyphenyl)propane anhydride, perylene-3,4,9,10-tetracarboxylic anhydride, bis(3,4-dicarboxyphenyl) ether anhydride, 3,3',4,4'-benzophenonetetracarboxylic anhydride, cyclobutane-1,2,3,4-tetracarboxylic anhydride, and cyclopentane-1,2,3,4-tetracarboxylic anhydride. Particularly preferred dicarboxylic anhydride are an aromatic series because of better heat resistance. Such a dicarboxylic anhydride may have a nonpolar atomic group bonded to its principal chain.

The examples of a polyamide series high molecular compound having a non-polar atomic group include:

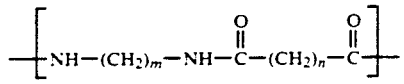

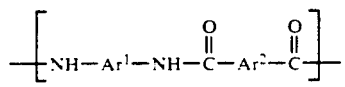

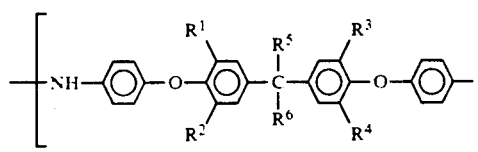

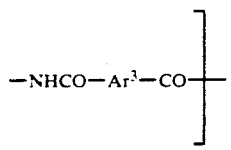

wherein, $Ar^1$, $Ar^2$ and $Ar^3$ represent an aryl group; $R^1$, $R^2$, $R^3$ and $R^4$, represent independently H, F, an alkyl group, a perfluoroalkyl group, and an alkoxy group; $R^5$ and $R^6$ represent independently H, F, an alkyl group and a perfluoroalkyl group.

The polyamide series high molecular compound having a non-polar atomic group preferably comprises a polar functional group in order to improve a solubility of the compound to a solvent used in preparing a coating solution. It is preferable that a polarity of the polar functional group is lowered by reaction with a cross linking agent or other additives added to the coating solution when the layer is subjected to a heating treatment.

A solvent for preparing a coating solution has to be capable of dissolving polyamic acid or polyamide each having a large non-polar atomic group, and has preferably a low molecular weight and appropriate volatility. A low molecular weight solvent enables a coating layer to dry more rapidly at a lower temperature and prevent irregularity on a layer surface caused by heat to form efficiently a layer composed of a high molecular compound. The solvent preferably comprises a low boiling point. A low boiling point solvent enables formation of a high molecular layer with good surface properties.

The examples of such solvent include N-methyl-2-pyrolidone, dimethylacetamide, dimethylformamide, dimethylsulfoxide, N-methylcaprolactam, tetramethylurea, pyridine, dimethylsulfolane, hexamethylphsporousamide and butyllactone. These polar solvents may be used either singly or in combination. A solvent not capable of dissolving polyamic acid or polyamide each having a non-polar atomic group may be mixed with the above-mentioned polar solvent as far as the mixed solvent can dissolve polyamic acid or polyamide; a low molecular weight solvent such as alcohol, ketone, ether or ester is added to lower a boiling point of the above-mentioned polar solvent and to improve a coating property of a coating solution to a substrate.

In preparing a coating solution, a concentration of a polyamic acid or polyamide each having a non-polar atomic group is usually 0.1 to 20%. An excessively high concentration deteriorates a coating property of a coating solution, while an excessively low concentration decreases a layer strength.

A coating method is not limited to a specific scope, and various methods can be used for this purpose. The available methods include a spin-coating process, a dip-coating process, a printing process, a roller-coating process, a brush-coating process and a spray coating process. A dry coating thickness is 100 to 2000Å°, preferably 200 to 1000Å°.

To improve evenness of a surface of a coated layer, the wet layer is preferably allowed to stand for a prescribed time after coating.

Next, the coated layer is subjected to a drying process if necessary, and then to a heating process to remove a solvent so that polyamic acid is converted to imide to form a high molecular polyimide or a high molecular polyamide, and a layer comprising of this high molecular compound is formed.

A drying process is performed according to necessity and may be omitted. The operation conditions of a drying process depend on a type of a solvent and are not always limited to a specific scope; one example is a drying time of several ten seconds to several ten minutes at 15° to 100° C.

A heating treatment is necessary for removing a residual solvent and promoting conversion to imide or crosslinking reaction for polymerization. For example, a heating temperature is 100° to 400° C., and a heating time is several ten minutes to several hours. A reasonable selection of the temperature and heating time makes it possible to freely adjust an alignment pretilt angle to considerably large extent.

These processes for coating, drying and heating have to be performed in a low humid atmosphere; the preceding treatments in a high humid atmosphere are liable to form flocculants on a coated layer or make a layer surface irregular due to a considerably low solubility of polyamic acid and polyamide each having a non-polar atomic group to a solvent and due to a hydgroscopicity of a polar solvent, which would prevent forming a uniform liquid crystal alignment layer.

A preferred relative humidity is not higher than 55%, more preferably not higher than 40%.

The high molecular layer formed according to the foregoing procedure is subjected to an aligning treatment with a relevant means to form an alignment layer. The means for providing an aligning treatment is not limited to a specific scope, and the various methods can be used for this purpose. The examples of such means are (1) a rubbing method where a surface of a layer is rubbed in a prescribed direction with cloth or the like, (2) a method where fine particles or fluid is sprayed or flowed on a surface of a layer in a prescribed direction, and (3) a method where a surface of a layer is subjected to corona discharge from a prescribed direction.

The alignment pretilt angle made by the alignment layer formed according to the foregoing procedure is adjusted by a size of a non-polar atomic group in a principal chain of a polyimide series or polyamide series high molecular compound, and by the extents of heating and aligning treatments. To be more detailed, the alignment pretilt angle increases with a larger number of carbon atoms of a non-polar atomic group, a higher heating temperature and a less intensive aligning treatment.

A nematic liquid crystal used for the invention is not limited to a specific scope, and the various materials can be used. The typical examples are shown as follows, however, the useful examples are not limited to them. They may be blended for use.

(1) Cyclohexylcarbonic ester represented by the following structural formula:

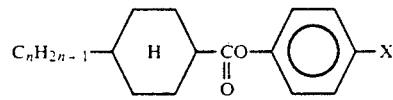

wherein X represents R (an alkyl group having 1 to 18 carbon atoms, hereinafter applicable), OR, CN and

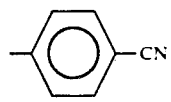

(2) Biphenyl compound represented by the following structural formula:

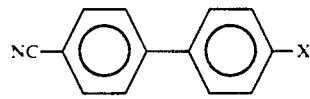

wherein X represents R, OR and

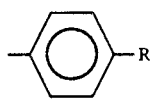

(3) Phenylcyclohexane compound represented by the following structural formula:

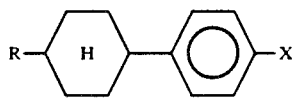

wherein X represents R, OR, CN and

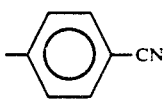

(4) Pyrimidine compound represented by the following structural formula:

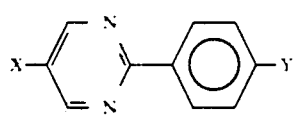

wherein X represents R, CN and

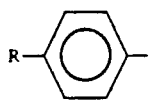

; Y represents R, OR and CN.

(5) Azo-azoxy compound represented by the following structural formula:

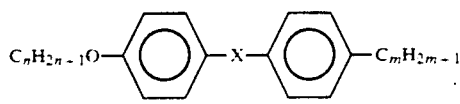

wherein X represents

—N=N—, —N=N—, —N=N—
           ↓        ↓
           O        O (6) Benzoic ester compound represented by the following structural formula:

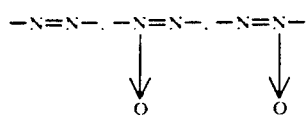

wherein X represents R, RO and
; Y represents R, OR, CN and

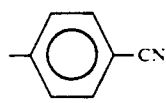

(7) Tolan compound represented by the following structural formula:

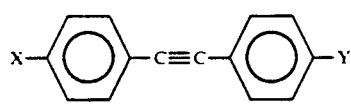

wherein X and Y independently represent F, R, OR and

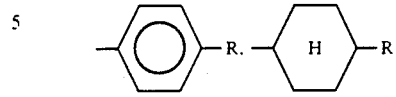

(8) Ethane compound represented by the following structural formula:

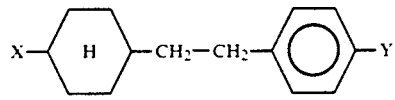

wherein X and Y independently represent R, OR.

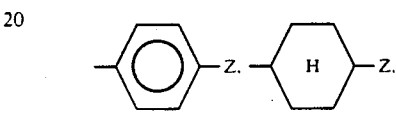

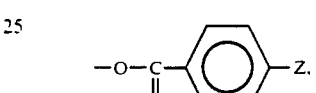

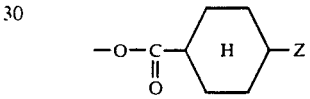

; and Z represents H, F, Cl, Br or R.

The nematic liquid crystal used for the invention may contain a smectic liquid crystal, cholesteric liquid crystal and the like, if necessary.

An ester, biphenyl, phenylclehexane or azo type nematic liquid crystal, which is usually known as a chiral liquid crystal and has an optically active group represented by the following formula at a terminal, can be used as an optically active substance;

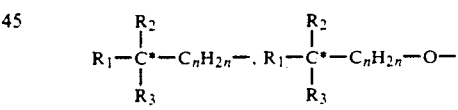

wherein $R_1$, $R_2$ and $R_3$ independently represents an alkyl group or a hydrogen atom, provided that $R_1$, $R_2$ and $R_3$ are different from each other.

More specifically, the useful nematic liquid crystals are shown as follows:

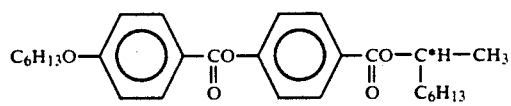

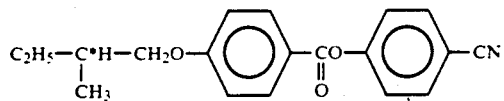

-continued

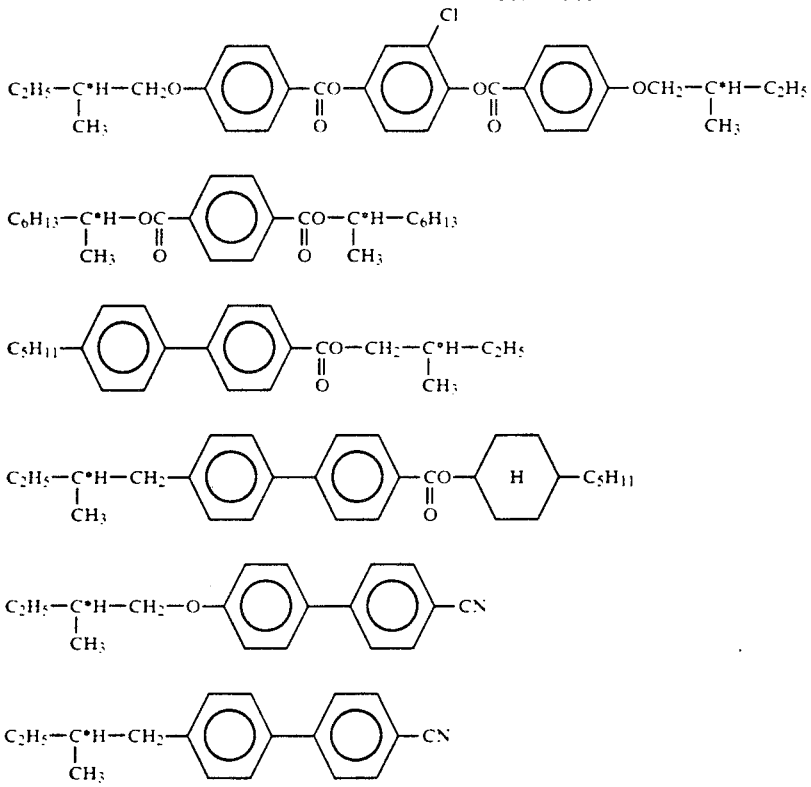

Other materials useful as an optically active substance added to a nematic liquid crystal include a chiral smectic liquid crystal and cholesteric liquid crystal.

A preferred optically active substance contained in a nematic liquid crystal layer of the invention is such that the spontaneous twist pitch per weight of the substance can be sufficiently shortened; selection of such optically active substance makes it possible to limit its required addition amount to a lower level, preferably to not more than 1.5 wt %, which in turn results in minimizing a decrease of a transition temperature $T_{NI}$ from a nematic liquid crystal to an isotropic liquid, which is caused by an addition of an optically active substance, and also results in decreasing a temperature dependency of the spontaneous twist pitch. In the invention, a plurality of optically active substances having the temperature change coefficients of the spontaneous twist pitches with the mutually reverse signs may be combinedly used in order to further decrease the temperature dependency of the spontaneous twist pitch.

EXAMPLES

The examples of the present invention are hereunder described in detail.

Figure 8:
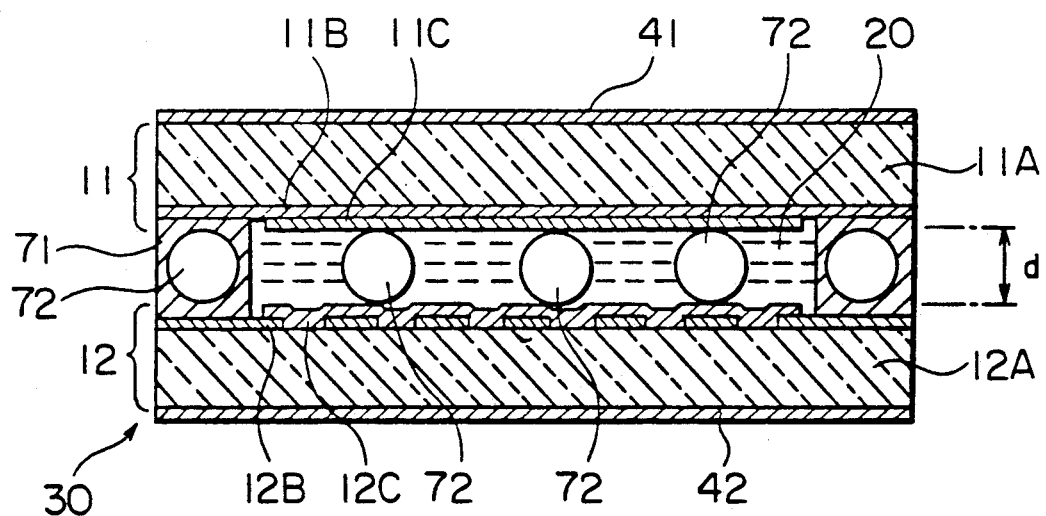

FIG. 8 schematically illustrates a liquid crystal display device of the invention.

An upper electrode substrate 11 and a lower electrode substrate 12 are oppositely disposed via a space, wherein the upper electrode substrate 11 is constituted with an electrode layer 11B and an alignment layer 11C provided on an inside face of a support 11A, and the lower electrode substrate is constituted with an electrode layer 12B and an alignment layer 12C provided on an inside face of a substrate 12A.

The space between the upper electrode substrate 11 and the lower electrode 12 substrate is sealed with a sealing 71 to constitute a liquid crystal cell 30. Inside the liquid crystal cell 30 are disposed separately a plurality of spacers 72 as well as a nematic liquid crystal with a twisted structure, which contains an optically active substance, to form a liquid crystal layer 20.

On the outside faces of the upper and lower electrode substrates are disposed a front polarizing plate 41 and a rear polarizing plate 42, respectively.

The electrode substrates 11 and 12 transmit light. In other words, this example is a liquid crystal display device of a transmittance type. A liquid display device of a reflection type can be formed by providing reflection plate on an outside face of the rear polarizing plate 42.

The materials used for the substrates 11A and 12A include glasses such as soda glass, borosilicate glass, quartz glass; plastic sheets made of uniaxial oriented polyethylene terephthalate, polyether sulfone and polyvinyl alcohol; metal sheets made of aluminum and stainless steel.

The electrode layers 11B and 12B are composed of transparent electrodes comprising, for example, of ITO (Si/In oxide) disposed on the surface of the supports 11A and 12A. A transparent electrode constituting the electrode layer 11B is arranged perpendicular to that of the other electrode layer 12B to constitute picture elements for a matrix display.

Further, the upper and lower electrode substrates 11 and 12 may comprise an insulating layer, a dielectric layer, an anti-alkali ion migration layer, an anti-reflection layer, a polarizing layer and a reflecting layer, if necessary.

In the invention, a light shielding layer is preferably provided on a non-picture element area, so that light leaking from the non-picture element area can be prevented, and therefore, the non-picture element can be darker to further increase a contrast. Such light shielding layer can be composed of a metal layer, a shielding layer containing black silver dispersed in an insulating binder such as gelatin, or a shielding layer containing a dyestaff or a pigment dispersed in an insulating binder.

EXAMPLES AND COMPARATIVE EXAMPLES

In each example or comparative example, a liquid crystal display device having the constitution shown in FIG. 8 was prepared based on the criteria shown in Tables 2 through 6.

The front polarizing plate 41 and the rear polarizing plate 42 were made of NPF-G1220DU manufactured by Nitto Denko, while the spacer 72 was made of a glass fiber, and the sealing 71 was made of XN-5A-C manufactured by Mitsui Toatsu Chemicals, Inc.

EVALUATION

With respect to each liquid crystal display device, display operation test was performed in multiplex driving at 1/100 duty ratio in order to evaluate luminance contrast and a degree of tinting on a display.

The degree of tinting was evaluated by visually checking a display, wherein the criteria for tinting evaluation were as follows; "o", virtually no tinting with clear displaying; "Δ", slight tinting with no problem for practical use; "x", significant tinting with a problem for practical use.

The evaluation results are summarized in Tables 2 through 6.

TABLE 2

|  | Example 1 | Example 2 | Example 3 | Example 4 | Comparative example 1 | Comparative example 2 |
|---|---|---|---|---|---|---|
| Twist angle α | 270° | 270° | 270° | 270° | 270° | 270° |
| Pretilt angle $\theta_0$ | 39° | 39° | 39° | 39° | 39° | 39° |
| Δn · d | 0.79 | 0.79 | 0.79 | 0.86 | 0.79 | 0.79 |
| Angle β | 43° | 40° | 37° | 39° | 46° | 30° |
| Angle γ | 47° | 50° | 53° | 51° | 44° | 60° |
| δ, ( ) means non-optimum value | (4°) | 10° | (16°) | 12° | (−2°) | (30°) |
| (Pc − Ps)/Ps | 0.05 | 0.05 | 0.05 | 0.02 | 0.05 | 0.05 |
| Alignment layer | SiO deposition layer Deposition angle, 7° Thickness, 1000 Å | SiO deposition layer Deposition angle, 7° Thickness, 1000 Å | SiO deposition layer Deposition angle, 7° Thickness, 1000 Å | SiO deposition layer Deposition angle, 7° Thickness, 1000 Å | SiO deposition layer Deposition angle, 7° Thickness, 1000 Å | SiO deposition layer Deposition angle, 7° Thickness, 1000 Å |
| Type of nematic liquid crystal | ZLI-2293 | ZLI-2293 | ZLI-2293 | ZLI-2293 | ZLI-2293 | ZLI-2293 |
| Δn | 0.132 | 0.132 | 0.132 | 0.132 | 0.132 | 0.132 |
| $k_{33}/k_{11}$ | 1.43 | 1.43 | 1.43 | 1.43 | 1.43 | 1.43 |
| $k_{33}/k_{22}$ | 2.5 | 2.5 | 2.5 | 2.5 | 2.5 | 2.5 |
| $\Delta\epsilon/\epsilon_\perp$ | 2.43 | 2.43 | 2.43 | 2.43 | 2.43 | 2.43 |
| Type of optically active substance | S-811 | S-811 | S-811 | S-811 | S-811 | S-811 |
| Rate of addition (wt %) | 1.278 | 1.278 | 1.278 | 1.15 | 1.278 | 1.278 |
| Thickness of liquid crystal layer, d | 6.0 μm | 6.0 μm | 6.0 μm | 6.0 μm | 6.0 μm | 6.0 μm |
| Luminance contrast | 59 | 148 | 36 | 230 | 17 | 4 |
| Degree of tinting | Δ | Δ | Δ | Δ | Δ | Δ |

ZLI-2293, Merck & Co., Inc.
S-811, chiral nematic liquid crystal, Merck & Co., Inc.

TABLE 3

|  | Example 5 | Example 6 | Example 7 | Example 8 | Comparative example 3 | Comparative example 4 |
|---|---|---|---|---|---|---|
| Twist angle α | 270° | 270° | 270° | 270° | 270° | 270° |
| Pretilt angle $\theta_0$ | 39° | 39° | 39° | 39° | 39° | 39° |
| Δn · d | 0.66 | 0.74 | 0.85 | 0.90 | 0.60 | 0.95 |
| Angle β | 40° | 40° | 40° | 40° | 40° | 40° |
| Angle γ | 50° | 50° | 50° | 50° | 50° | 50° |
| δ | 10° | 10° | 10° | 10° | 10° | 10° |
| (Pc − Ps)/Ps | 0.05 | 0.05 | 0.05 | 0.05 | 0.05 | 0.05 |
| Alignment layer | SiO deposition layer Deposition angle, 7° Thickness, 1000 Å | SiO deposition layer Deposition angle, 7° Thickness, 1000 Å | SiO deposition layer Deposition angle, 7° Thickness, 1000 Å | SiO deposition layer Deposition angle, 7° Thickness, 1000 Å | SiO deposition layer Deposition angle, 7° Thickness, 1000 Å | SiO deposition layer Deposition angle, 7° Thickness, 1000 Å |
| Type of nematic liquid crystal | ZLI-2293 | ZLI-2293 | ZLI-2293 | ZLI-2293 | ZLI-2293 | ZLI-2293 |
| Δn | 0.132 | 0.132 | 0.132 | 0.132 | 0.132 | 0.132 |
| $k_{33}/k_{11}$ | 1.43 | 1.43 | 1.43 | 1.43 | 1.43 | 1.43 |
| $k_{33}/k_{22}$ | 2.5 | 2.5 | 2.5 | 2.5 | 2.5 | 2.5 |
| $\Delta\epsilon/\epsilon_\perp$ | 2.43 | 2.43 | 2.43 | 2.43 | 2.43 | 2.43 |
| Type of optically active substance | S-811 | S-811 | S-811 | S-811 | S-811 | S-811 |
| Rate of addition (wt %) | 1.53 | 1.37 | 1.20 | 1.13 | 1.70 | 1.06 |
| Thickness of liquid | 5.0 μm | 5.6 μm | 6.4 μm | 6.8 μm | 4.5 μm | 7.2 μm |

TABLE 3-continued

|  | Example 5 | Example 6 | Example 7 | Example 8 | Comparative example 3 | Comparative example 4 |
|---|---|---|---|---|---|---|
| crystal layer, d |  |  |  |  |  |  |
| Luminance contrast | 109 | 142 | 90 | 62 | 68 | 43 |
| Degree of tinting | Δ | Δ | Δ | Δ | x | x |

ZLI-2293: Merck & Co., Inc.
S-811: chiral nematic liquid crystal, Merck & Co., Inc.

TABLE 4

|  | Example 9 | Example 10 | Example 11 | Example 12 | Example 13 | Example 14 |
|---|---|---|---|---|---|---|
| Twist angle α | 270° | 270° | 270° | 260° | 240° | 300° |
| Pretilt angle $\theta_0$ | 41° | 41° | 41° | 39° | 39° | 39° |
| Δn · d | 0.80 | 0.80 | 0.80 | 0.79 | 0.79 | 0.79 |
| Angle β | 35° | 39° | 40° | 45° | 55° | 25° |
| Angle γ | 55° | 51° | 50° | 45° | 35° | 65° |
| δ | 20° | 12° | 10° | 10° | 10° | 10° |
| (Pc − Ps)/Ps | 0.1 | 0.0 | −0.1 | 0.0 | −0.05 | 0.1 |
| Alignment layer | SiO deposition layer Deposition angle, 7° Thickness, 1000 Å | SiO deposition layer Deposition angle, 7° Thickness, 1000 Å | SiO deposition layer Deposition angle, 7° Thickness, 1000 Å | SiO deposition layer Deposition angle, 7° Thickness, 1000 Å | SiO deposition layer Deposition angle, 7° Thickness, 1000 Å | SiO deposition layer Deposition angle, 7° Thickness, 1000 Å |
| Type of nematic liquid crystal | CR-4008 | CR-4008 | CR-4008 | ZLI-2293 | ZLI-2293 | ZLI-2293 |
| Δn | 0.15 | 0.15 | 0.15 | 0.132 | 0.132 | 0.132 |
| $k_{33}/k_{11}$ | 1.1 | 1.1 | 1.1 | 1.43 | 1.43 | 1.43 |
| $k_{33}/k_{22}$ | — | — | — | 2.5 | 2.5 | 2.5 |
| $\Delta\epsilon/\epsilon_\perp$ | 2.42 | 2.42 | 2.42 | 2.43 | 2.43 | 2.43 |
| Type of optically active substance | S-811 | S-811 | S-811 | S-811 | S-811 | S-811 |
| Rate of addition (wt %) | 1.62 | 1.47 | 1.32 | 1.17 | 1.03 | 1.49 |
| Thickness of liquid crystal layer, d | 5.3 μm | 5.3 μm | 5.3 μm | 6.0 μm | 6.0 μm | 6.0 μm |
| Luminance contrast | 35 | 87 | 138 | 150 | 128 | 76 |
| Degree of tinting | Δ | Δ | Δ | Δ | Δ | Δ |

CR-4008: Chisso Corporation
ZLI-2293: Merck & Co., Inc.
S-811: chiral nematic liquid crystal, Merck & Co., Inc.

TABLE 5

|  | Example 15 | Example 16 | Example 17 | Example 18 | Example 19 | Comparative example 5 |
|---|---|---|---|---|---|---|
| Twist angle α | 270° | 270° | 270° | 270° | 270° | 270° |
| Pretilt angle $\theta_0$ | 39° | 39° | 25° | 35° | 50° | 10° |
| Δn · d | 0.79 | 0.79 | 0.79 | 0.79 | 0.86 | 0.75 |
| Angle β | 25° | −5° | 35° | 38° | 43° | 28° |
| Angle γ | 35° | 5° | 55° | 52° | 47° | 62° |
| δ | 10° | 10° | 20° | 14° | 4° | 34° |
| (Pc − Ps)/Ps | 0.05 | 0.05 | −0.05 | 0.0 | 0.05 | 0.05 |
| Alignment layer | SiO deposition layer Deposition angle, 7° Thickness, 1000 Å | SiO deposition layer Deposition angle, 7° Thickness, 1000 Å | SiO deposition layer Deposition angle, 12° Thickness, 1000 Å | SiO deposition layer Deposition angle, 9° Thickness, 1000 Å | SiO deposition layer Deposition angle, 5° Thickness, 1000 Å | Polyimide rubbing layer Thickness, 700 Å |
| Type of nematic liquid crystal | ZLI-2293 | ZLI-2293 | ZLI-2293 | ZLI-2293 | ZLI-2293 | ZLI-2293 |
| Δn | 0.132 | 0.132 | 0.132 | 0.132 | 0.132 | 0.132 |
| $k_{33}/k_{11}$ | 1.43 | 1.43 | 1.43 | 1.43 | 1.43 | 1.43 |
| $k_{33}/k_{22}$ | 2.5 | 2.5 | 2.5 | 2.5 | 2.5 | 2.5 |
| $\Delta\epsilon/\epsilon_\perp$ | 2.43 | 2.43 | 2.43 | 2.43 | 2.43 | 2.43 |
| Type of optically active substance | S-811 | S-811 | S-811 | S-811 | S-811 | S-811 |
| Rate of addition (wt %) | 1.278 | 1.278 | 1.16 | 1.22 | 1.18 | 1.22 |
| Thickness of liquid crystal layer, d | 6.0 μm | 6.0 μm | 6.0 μm | 6.0 μm | 6.5 μm | 5.7 μm |
| Luminance contrast | 33 | 12 | 45 | 65 | 250 | 11 |
| Degree of tinting | o | o | Δ | Δ | Δ | Δ |

ZLI-2293: Merck & Co., Inc.
S-811: chiral nematic liquid crystal, Merck & Co., Inc.

TABLE 6

|  | Example 20 | Example 21 | Example 22 |
|---|---|---|---|
| Twist angle $\alpha$ | 270° | 270° | 270° |
| Pretilt angle $\theta_0$ | 30° | 36° | 45° |
| $\Delta n \cdot d$ | 0.80 | 0.84 | 0.81 |
| Angle $\beta$ | 38° | 41° | 41° |
| Angle $\gamma$ | 52° | 49° | 49° |
| $\delta$ | 14° | 8° | 8° |
| $(Pc - Ps)/Ps$ | 0.0 | 0.05 | 0.05 |
| Alignment layer | Polyimide rubbing layer RN-715 Thickness, 1000 Å | Polyimide rubbing layer RN-715 Thickness, 1000 Å | Polyimide rubbing layer RN-066 Thickness, 1000 Å |
| Type of nematic liquid crystal | CR-4008 | ZLI-3239 | ZLI-3275 |
| $\Delta n$ | 0.15 | 0.1395 | 0.124 |
| $k_{33}/k_{11}$ | 1.1 | 1.49 | 1.19 |
| $k_{33}/k_{22}$ | — | 2.7 | 2.3 |
| $\Delta\epsilon/\epsilon_\perp$ | 2.42 | 2.71 | 2.32 |
| Type of optically active substance | S-811 | S-811 | S-811 |
| Rate of addition (wt %) | 1.47 | 1.11 | 1.15 |
| Thickness of liquid crystal layer, d | 5.3 μm | 6.0 μm | 6.5 μm |
| Luminance contrast | 68 | 165 | 84 |
| Degree of tinting | Δ | Δ | Δ |

ZLI-3239, Merck & Co., Inc
ZLI-3275, Merck & Co., Inc
S-811, chiral nematic liquid crystal, Merck & Co., Inc
RN-715, Nissan Chemical Industries, Ltd
RN-066, Nissan Chemical Industries, Ltd

EFFECTS OF THE INVENTION

As described above. Conditions (a) through (d) can be satisfied according to the invention, so that it is possible to manufacture a liquid crystal display device of a simple constitution at a reduced cost, which can provide an excellent display having a high contrast and free of tinting in multiplex driving at a high duty ratio.

When the angle $\beta$ satisfies Equation (3), a luminance contrast is further enhanced.

Furthermore, when Conditions (e) through (g) are satisfied, ON and OFF of a displayed image can be made quickly in multiplex driving.

What is claimed is:

1. A liquid crystal display device comprising a liquid crystal cell having a liquid crystal layer in which a nematic liquid crystal containing an optically active substance which defines a director at each surface of the liquid crystal layer and forming a twisted structure is disposed between a pair of electrode substrates being oppositely disposed and each having an alignment layer, and a pair of polarizing plates having polarizing axis disposed on opposite sides of said liquid crystal cell, the polarizing axis forming angles $\beta$ and $\gamma$ between each polarizing axis and the respective director, wherein said liquid crystal display device is characterized by satisfying Conditions (a) to (c);

Condition (a): a pretilt angle $\theta_o$ made by a director of liquid crystal molecules contacting a face of the electrode substrate and the electrode substrate itself is not less than 30°;

Condition (b): a product, $\Delta n \cdot d$, of a refractive anisotropy, $\Delta n$, of the nematic liquid crystal and a thickness, d, of the liquid crystal layer is 0.65 to 0.90 μm;

Condition (c): a twist angle $\alpha$, and angles $\beta$ and $\gamma$ satisfy Equation (1);

$$\alpha + \beta - \gamma - 180° = 90° - \delta \quad (1)$$

$$0° < \delta < 25°$$

wherein $\delta$ is inversely related to $\theta_o$ and wherein said twist angle $\alpha$ equals $270° - \delta$.

2. The display device of claim 1, wherein a spontaneous twist pitch Ps of the nematic liquid crystal containing the optically active substance and a compulsive twist pitch Pc of the liquid crystal layer in which the twisted structure is forcibly regulated by the alignment layer satisfy Equation (2);

$$-0.1 < (Pc - Ps)/Ps < 0.3.$$

3. The display device of claim 1, wherein a spray elastic constant $k_{11}$ or a twist elastic constant $K_{22}$ and a bend elastic constant $K_{33}$ of the nematic liquid crystal satisfy at least one of Equations (3) and (4);

$$1.8 < k_{33}/k_{22} < 2.8$$

$$0.9 < k_{33}/k_{11} < 1.5.$$

4. The display device of claim 1, wherein a ratio, $\Delta\epsilon/\epsilon_\perp$, of a dielectric anisotropy, $\Delta\epsilon$, of the nematic liquid crystal to a dielectric constant, $\epsilon$, in a direction perpendicular to a parallel axis of the liquid crystal molecules is not less than 1.8.

5. The display device of claim 1, wherein a transition temperature $T_{NI}$ of the liquid crystal converted from a nematic liquid crystal phase to an isotropic liquid is not lower than 90°C.

6. The display device of claim 1, wherein the refractive anisotropy, $\Delta n$, is not less than 0.10.

7. The display device of claim 1, wherein a viscosity, $\eta$, of the liquid crystal at 20°C. not more than 30 cp.

8. The display device of claim 1, wherein said alignment layer is formed by evaporation-depositing or spattering SiO, MgO or $MgF_2$.

9. The display device of claim 1, wherein said alignment layer comprises of a layer composed of a high molecular compound having a non-polar atomic group in a principal chain.

10. The display device of claim 9, wherein said non-polar atomic group comprises carbon atoms not less than 5.

11. The display device of claim 9, wherein said non-polar atomic group is an alkyl group or a perfluoroalkyl group.

12. The display device of claim 9, wherein said high molecular compound is a polyimide or polyamide type polymer.

13. The display device of claim 1, wherein said product, $\Delta n \cdot d$, is 0.75 to 0.90.

14. The display device of claim 1, wherein said distortion angle $\beta$ satisfies Equation (5);

$$\beta = (360 - \alpha)/2 - \delta 2.$$

15. A method for making a liquid crystal device comprising a liquid crystal cell having a liquid crystal layer in which a nematic liquid crystal containing an optically active substance which defines a director at each surface of the liquid crystal layer and forming a twisted structure is disposed between a pair of electrode substrates being oppositely disposed and each having an alignment layer, and a pair of polarizing plates having polarizing axis disposed on opposite sides of the liquid crystal cell, the polarizing axis forming angles $\beta$ and $\gamma$ between each polarizing axis and the respective director, the method of making the liquid crystal device comprising the steps of:

setting a twist angle $\alpha$ of the twisted structure in the liquid crystal layer between 220° and 300°;

setting a pretilt angle $\theta_o$ made by a director of liquid crystal molecules contacting a face of the electrode substrate and the electrode substrate itself not less than 25°;

calculating a product, $\Delta n \cdot d$, of a refractive anisotropy, $\Delta n$, of the nematic liquid crystal and a thickness, d, of the liquid crystal layer;

setting the product $\Delta n \cdot d$ between 0.65 and 0.90 μm; and setting angles $\beta$ and $\gamma$ to satisfy Equation (1):

$$\alpha - \beta - \gamma - 180° = 90° - \delta \quad (1)$$

$$0° < \delta < 30°;$$

wherein the twist angle $\alpha$ equals $270° - \delta$.

16. A method of making a liquid crystal device as claimed in claim 15 wherein the pretilt angle $\theta_0$ is set greater than 30° and $0° < \delta < 25°$ wherein $\delta$ is inversely related to $\theta_o$.

17. A method of making a liquid crystal device as claimed in claim 15 further comprising the step of setting a spontaneous twist pitch Ps of the nematic liquid crystal containing the optically active substance and a compulsive twist pitch Pc of the liquid crystal layer in which the twisted structure is forcibly regulated by the alignment layer to satisfy Equation (2);

$$-0.1 < (Pc - Ps)/Ps < 0.3.$$

18. A method of making a liquid crystal device as claimed in claim 17 further comprising the step of setting a ratio, $\Delta\epsilon/\epsilon$, of a dielectric anisotropy, $\Delta\epsilon$, of the nematic liquid crystal to a dielectric constant, $\epsilon$, in a direction perpendicular to a parallel axis of the liquid crystal molecules to not less than 1.8.

19. The display device of claim 1, wherein $\delta$ equals 10°.

* * * * *

UNITED STATES PATENT AND TRADEMARK OFFICE
CERTIFICATE OF CORRECTION

PATENT NO. : 5,124,825

DATED : June 23, 1992

INVENTOR(S) : Kazuo Asano et al.

It is certified that error appears in the above-identified patent and that said Letters Patent is hereby corrected as shown below:

Claim 2, column 26, line 12, after the equation, at the end of the line, insert --(2)--.

Claim 3, column 26, line 18, after the equation, at the end of the line, insert --(3)--.

Claim 3, column 26, line 20, after the equation, at the end of the line, insert --(4)--.

Claim 4, column 26, line 23, change "anistropy" to --anisotropy--.

Claim 7, column 26, line 34, before "not" insert --is--.

Claim 13, column 26, line 52, after "0.90" insert --µm--.

Claim 14, column 26, line 53, delete "distortion".

Claim 14, column 26, line 56, change "$\delta 2.$" to --$\delta/2$--.

Claim 14, column 26, line 56, after the equation, at the end of the line, insert --(5)--.

UNITED STATES PATENT AND TRADEMARK OFFICE
CERTIFICATE OF CORRECTION

PATENT NO. : 5,124,825
DATED : June 23, 1992
INVENTOR(S) : Kazuo Asano et al.

It is certified that error appears in the above-indentified patent and that said Letters Patent is hereby corrected as shown below:

Claim 17, column 28, line 11, after equation, at the end of the line, insert --(2)--.

Signed and Sealed this

Twenty-eighth Day of September, 1993

Attest:

BRUCE LEHMAN

Attesting Officer     Commissioner of Patents and Trademarks